Patented May 16, 1939

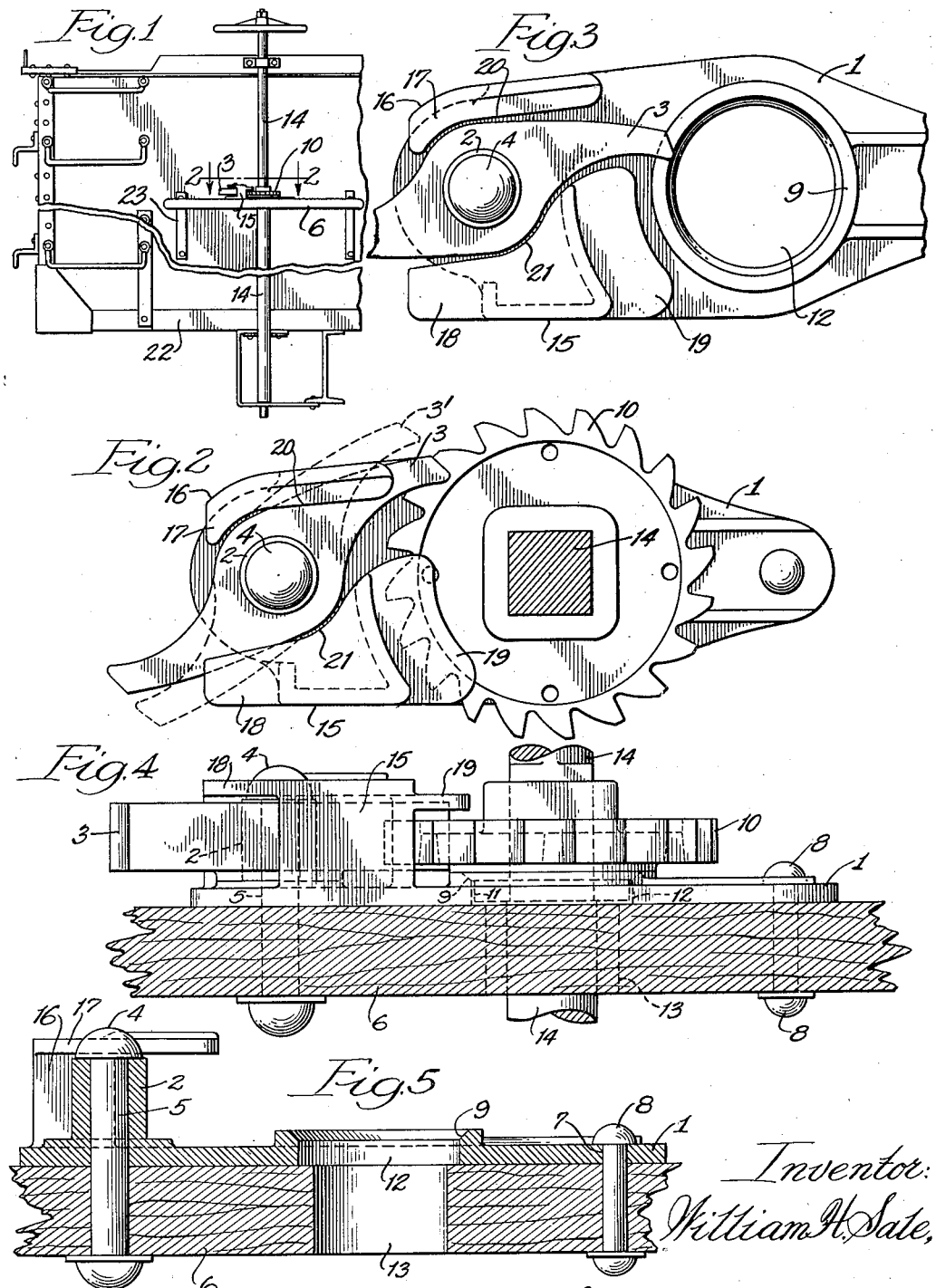

2,158,429

UNITED STATES PATENT OFFICE 2,158,429

HAND BRAKE HOLDING MECHANISM

William H. Sale, Richmond, Va., assignor to Naylor Patents Corporation, a corporation of Delaware Application October 4, 1937, Serial No. 167,253

3 Claims. (Cl. 188—81.1)

This invention is in that class of ratchet holding means used on the hand brake mechanism of railway freight cars.

The purpose of the invention is mainly to improve such constructions to render them more safe. It is common practice to bolt the pawl plate with the head of the bolt above the pawl and the nut on the underside of the step board, and then if the nut is lost it may not be missed on inspection for that reason. Accordingly, it becomes possible for the bolt to be vibrated out and the pawl may be lost. This is particularly dangerous, for example, in the case of coal cars which are sometimes rolled over to unload the coal on conveyors used in bunkering ships, at which time the pawl may be lost. When the pawl is lost it is impossible for a brakeman to control the car on a down grade.

In the new constructions it is not necessary to use bolts. The pawl plate may be permanently riveted to the step board, and it is so constructed to serve not only as a bearing for the pawl, but as a ratchet pawl retaining means cooperating with the ratchet wheel in a manner to render the ratchet wheel an effective lock for the pawl. Thus, to remove the pawl it is necessary to first remove the ratchet wheel from the brake wheel staff and in assembly the pawl must be placed upon the plate before the ratchet wheel is placed in position to receive the staff.

The objects of the invention are attained by a construction as illustrated in the drawing, wherein:

Fig. 1 shows partly broken away an end view of a freight car with the hand brake mechanism mounted thereon.

Fig. 2 is a plan view of the brake retaining unit showing the hand wheel staff in section, as indicated by the line 2—2 of Fig. 1.

Fig. 3 is a fragmentary plan view of the pawl plate and pawl with the pawl in that position which occurs only during assembly prior to placing the ratchet wheel.

Fig. 4 shows the brake retaining mechanism in side elevation with the step board in section.

Fig. 5 is a longitudinal section of the pawl plate showing the latter riveted to the step board which is in section and partly broken away.

With the new construction it is preferred to permanently rivet the pawl plate to the step board and not to use any fastening means such as bolts which might be vibrated loose under the rather severe conditions of freight car operation.

The principal feature of the construction is the pawl plate having flanged walls which extend over the pawl when the ratchet wheel is in place, but the arrangement is such that in assembly it is necessary to drop the pawl into its seat or over a hollow bearing trunnion on the plate and then to oscillate the pawl out of that position before the ratchet wheel is positioned to receive the brake wheel staff. When the ratchet wheel is in position on the plate the pawl cannot rock back to the position necessary for its removal. The pawl plate is indicated in the drawing at 1, as a one-piece construction having a hollow trunnion 2 which is the bearing for the pawl 3. The trunnion 2 is of larger diameter than the head 4 of a rivet 5 which passes through the hollow trunnion and the step board 6. The central opening in the pawl fits trunnion 2 and is larger than the head 4 of rivet 5.

The pawl plate 1 is also apertured at 7 to receive another rivet 8 used for securing the pawl plate to the step board. Centrally the plate has an internally beveled bearing seat 9 for ratchet wheel 10. The boss 11 of the ratchet wheel fits the opening 12 of the pawl plate, which opening is in alinement with opening 13 in the step board and through which the brake wheel staff 14 extends.

The pawl plate has upwardly extending side walls 15 and 16 which, at their upper ends have inwardly extending flanges 17 and 18 of such form as to permanently retain the pawl in the assembly in cooperation for that purpose with the ratchet wheel 10. The wall 15 also has another horizontal flange 19 extending over the ratchet wheel which prevents the latter from working up on the staff away from the pawl.

The flanges 17 and 18 have inner edges 20 and 21 conforming to the outline of the pawl, and spaced apart to allow the pawl to be dropped in its assembled position on trunnion 2 before the ratchet is placed in its bearing (see Fig. 3). In the assembly of the unit after the pawl is placed as indicated by Fig. 3, it is then rocked to the broken line position 3', Fig. 2, to allow clearance for placement of the ratchet wheel in its bearing in the pawl plate. The edge of the ratchet wheel is first inserted underneath flange 19 and then it is swung down into its seat. After that the limits of oscillation of the pawl are as indicated by 3 and 3' in Fig. 2.

The brake wheel staff 14 is of customary construction, and is mounted as usual. The staff is of square section where it receives the ratchet wheel. Above the ratchet wheel it is of round section of slightly less diameter than the round section beneath the ratchet wheel. The staff may be placed in the assembly before the pawl plate is riveted to the step board, but in removing the brake staff from the car the brake chain and cotter key are first detached from the bottom of the staff. Then the staff is moved up about fifteen inches to the top of the end sill 22 (Fig. 1), before being lowered and passed out of the step board. To allow for that action the step board 6 is detached from its supporting brackets 23.

The ratchet wheel and the pawl are of standard configuration and cooperate as usual. When the brakeman turns the hand wheel in a winding direction the tail of the pawl is engaged by foot for shifting the pawl into holding position when required.

I claim:

1. A holding mechanism for hand brakes comprising a pawl and a ratchet wheel, a pawl plate having a bearing for said pawl and having side walls around said bearing and partly housing the pawl with inwardly extending flanges located to extend over and confine the pawl when the pawl is in operative position and being shaped to clear the pawl in another position, and said pawl plate having a bearing for supporting the ratchet wheel in position to prevent the pawl from moving clear of said flanges.

2. A holding mechanism for hand brakes comprising a pawl and a ratchet wheel, a pawl plate having a trunnion for removably receiving a pawl and having side walls around said trunnion and partly housing the pawl and with inwardly extending flanges located to extend over the pawl when the pawl is in operative position, and a bearing for supporting the ratchet wheel on the pawl plate in position to prevent the pawl from moving clear of said flanges.

3. A holding mechanism for hand brakes comprising a pawl plate having a trunnion for removably receiving a pawl, a pawl on said trunnion, said plate having side walls with inwardly extending flanges located to extend over the pawl when said pawl is in its operative positions, the opposed edges of said flanges being shaped to permit removal of said pawl when turned to a certain non-operative position, a ratchet wheel supported on the pawl plate in position to prevent the pawl from moving clear of said flanges, and one of said side walls having a flange extending over the ratchet wheel.

WILLIAM H. SALE.